(12) United States Patent
Smalser et al.

(10) Patent No.: US 6,617,705 B1
(45) Date of Patent: Sep. 9, 2003

(54) PROTECTION ARRANGEMENT FOR NATURAL ENERGY POWER GENERATION SYSTEMS

(75) Inventors: Paul J Smalser, Hamilton Square, NJ (US); Charles B Carroll, Trenton, NJ (US)

(73) Assignee: Ocean Power Technologies, Inc., Pennington, NJ (US)

(*) Notice: Subject to any disclaimer, the term of this patent is extended or adjusted under 35 U.S.C. 154(b) by 0 days.

(21) Appl. No.: 09/429,419

(22) Filed: Oct. 28, 1999

Related U.S. Application Data

(60) Provisional application No. 60/105,990, filed on Oct. 28, 1998.

(51) Int. Cl.[7] .................. F03B 13/10; F03B 13/12; H02P 9/04; F02B 13/00
(52) U.S. Cl. .................. 290/42; 290/43; 290/53; 290/54
(58) Field of Search .................. 290/42, 43, 53, 290/54; 60/502, 640, 398, 495, 497; 416/6, 86; 407/334, 331

(56) References Cited

U.S. PATENT DOCUMENTS

| | | | | | |
|---|---|---|---|---|---|
| 3,974,395 | A | * | 8/1976 | Bright | 290/44 |
| 4,146,264 | A | * | 3/1979 | Korzeniewski | 290/44 |
| 4,208,877 | A | * | 6/1980 | Evans et al. | 60/495 |
| 4,418,287 | A | * | 11/1983 | Syverson | 290/44 |
| 4,461,957 | A | * | 7/1984 | Jallen | 290/44 |
| 4,510,397 | A | * | 4/1985 | Schroeder, Jr. | 290/43 |
| 4,617,991 | A | * | 10/1986 | Luetzelschwab | 166/53 |
| 4,754,157 | A | * | 6/1988 | Windle | 290/53 |
| 4,774,855 | A | * | 10/1988 | Murrell et al. | 74/687 |
| 5,083,039 | A | * | 1/1992 | Richardson et al. | 290/44 |
| 5,136,173 | A | * | 8/1992 | Rynne | 290/53 |
| 5,503,349 | A | * | 4/1996 | Chertok | 242/422.2 |
| 5,548,177 | A | * | 8/1996 | Carroll | 310/339 |
| 5,921,082 | A | * | 7/1999 | Berling | 60/325 |
| 6,020,653 | A | * | 2/2000 | Woodbridge et al. | 290/53 |
| 6,091,161 | A | * | 7/2000 | Dehlsen et al. | 290/43 |
| 6,109,029 | A | * | 8/2000 | Vowles et al. | 60/398 |
| 6,137,187 | A | * | 10/2000 | Mikhail et al. | 290/44 |
| 6,205,405 | B1 | * | 3/2001 | Pouvreau | 702/41 |
| 6,300,689 | B1 | * | 10/2001 | Smalser | 290/43 |

* cited by examiner

*Primary Examiner*—Nestor Ramirez
*Assistant Examiner*—Julio C. Gonzalez
(74) *Attorney, Agent, or Firm*—Michael Y. Epstein

(57) ABSTRACT

Protection against damage caused by excessively high input energies, e.g., from ocean storms, is provided in energy converting systems by, in response to the detection of excessively high input energies, changing the electrical impedance of the electrical load to which power from an electrical generator is being delivered for increasing the generator output current for reducing the power converting efficiency of the generator. This increases the mechanical impedance presented by the generator to the source of input energy for reducing the motion producing effect of the input energy.

1 Claim, 1 Drawing Sheet

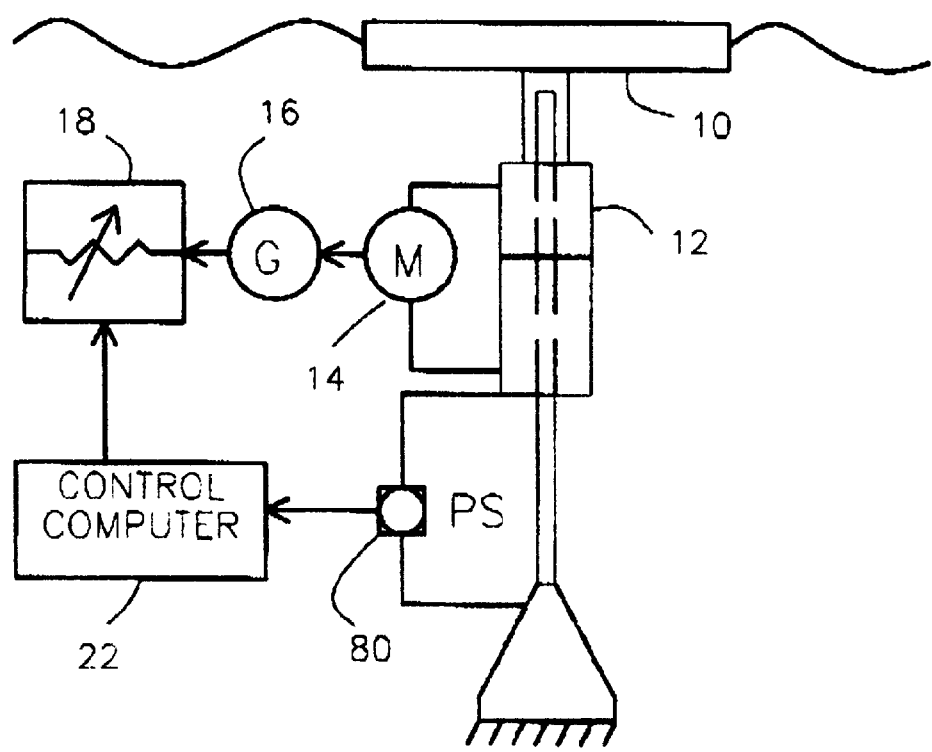

PROTECTION ARRANGEMENT FOR NATURAL ENERGY POWER GENERATION SYSTEMS

This application claims the benefit of provisional patent application 60/105,990 filed Oct. 28, 1998.

BACKGROUND OF THE INVENTION

This invention relates to the generation of electrical power from natural sources of energy, e.g., ocean waves, and particularly to the protection of the power generating system during conditions of excessively high levels of input energy, e.g., during ocean storms, while still operating the system for producing power.

One technique for protecting a power generating system during excessively high levels of input energy is simply to shut the system down; e.g., submerge a floating system normally responsive to the passage of ocean waves sufficiently deeply to be isolated from the surface storm conditions. A problem with this, however, is that power production is lost while the system is shut down.

Solutions are known where the power generating systems are only partially shut down; e.g., a system normally floating freely on the surface of an ocean is submerged beneath the surface but at a depth still responsive to the over-passing waves. Generally, however, such partial shut down solutions are complex and relatively slow operating.

The present invention provides a protection arrangement which is simple, inexpensive and quickly responsive to changing circumstances.

SUMMARY OF THE INVENTION

In a power generating system using an electrical generator for generating electrical output power from the system, protection against excessive input energy levels is obtained by increasing the current output from the generator to an amount greater than that would "normally" otherwise be generated at the generator output in response to the increased energy input. The higher than normal output current changes the system operating efficiency and increases the mechanical impedance of the system to a level higher than would be present if the "normal" output current were being generated. The higher system mechanical impedance thus "stiffens" the system against the increased input energy, thus preventing for example, excessively high generator speeds of rotation. The system, while now operating at a less than optimum operating efficiency, continues to generate power.

DESCRIPTION OF THE DRAWING

The sole drawing FIGURE is a schematic illustration of a power generating system in accordance with the invention.

DESCRIPTION OF PREFERRED EMBODIMENTS OF THE INVENTION

With reference to the drawing, a power generating system is illustrated for converting, by way of one example of use of the invention, energy contained in waves on the surface of an ocean to useful electrical power. Many such systems are known. Herein, quite simply, a float 10 vertically oscillates in response to passing waves for driving a hydraulic cylinder 12 for pressurizing a fluid for driving a hydraulic motor 14 for driving an electrical generator 16 for generating electrical energy for transfer to an electrical load 18, e.g., an a.c. to d.c. rectifier for charging a storage battery.

Normally, the problem is to maximize the power output from the system, and the system is designed for operation at maximum possible efficiency.

As known, various energy converters, such as ocean wave and wind and water flow energy converters operate most efficiently when they are driving a power generating system whose impedance is matched to the configuration of the energy converter, and to the natural energy level present. The impedance can be thought of as the ratio of the force required to drive a system to the velocity produced in the driven system. A low impedance system will move rapidly when a small force is applied, whereas a high impedance, or stiff, system will move slowly even when a large force is applied. The power delivered to a system is the product of force and velocity (e.g., Newtons times meters per second (Nm/s) equals Watts of power). Drive systems for natural energy sources are normally designed and controlled to produce the maximum product of force and velocity delivered as power from the entire system.

During times of storms or other events, there can be very large amounts of natural energy impinging on a wave or flow energy converter. When this high natural energy is converted to mechanical energy, the system can be damaged or destroyed. For example, a piston with a physically defined stroke can be driven through its end stops, or a turbine can be driven fast enough that it is structurally damaged, or that its attached generator produces voltages that exceed the limits of the generator or its circuitry.

The disclosed invention prevents system damage due to storms, while still producing power, by adjusting the impedance of the system from the optimum system efficiency values to high levels that impede the production of large motions or speeds. The technique for system impedance adjustment is to vary the electrical load of the electric power generator. These higher levels of system impedance do not just absorb the natural energy less efficiently, they greatly reduce the conversion efficiency of the natural energy converter. This greatly reduces the level of mechanical energy delivered to the drive system and prevents damage. This disclosed system is intelligent and reduces overly high energy available to acceptable levels while continuing to generate useful power.

The electric power generated by an electromagnetic generator is comprised of volts (potential) and amps (current). The product of the voltage times the amperage is the power in Watts ($P=V \times A$). Thus, 100 Watts of power could be comprised of 100 volts times 1 amp, or 1 volt times 100 amps. With electromagnetic generators, the voltage produced is directly related to the generator's speed of rotation. The amount of current that can be produced at that voltage is directly related to the torque applied to the generator's shaft. These properties provide the opportunity for the generator's electronic circuitry to control the generator's mechanical impedance as seen at its drive shaft. As an example, assume a generator is being driven with a shaft speed of 5 Hertz (Hz), and is producing 100 volts while 1 amp is being drawn from the generator by its power circuitry. The generator is producing 100 Watts. The equation for mechanical power in a rotary device is $P=2Tf$, where:

P=mechanical power in Watts
T=the torque applied to the shaft in Nm
f=frequency of shaft rotation in Hz In this case, $100=2T5$, and therefore the torque required at the shaft is at least T=3.18 Nm. The reason that the term "at least" is used is that a generator is not 100% efficient in converting torque into electrical current. However, the torque and current are directly related in a particular generator operating under particular conditions, and the principles of operation herein disclosed remain true for all typical generators. Therefore, in the present illustrative example, it is accepted that the torque-to-current coefficient of the generator is T=3.18 Nm/amp.

In this example, if the power electronics circuit begins to draw 2 amps from the generator, the immediate power produced would be 200 Watts. If the natural energy source is providing sufficient energy, the generator speed can remain at 5 Hz, the torque input will be 6.36 Nm, and the power generated will remain at 200 Watts. This situation is good from an economic point of view, but does not provide over-stroke protection. If the power electronics circuit begins to draw 3 amps from the generator, the immediate power produced would be 300 Watts and the torque required would be T=3×3.18=9.54 Nm. If the natural energy source is not providing sufficient energy to produce this torque, the generator speed cannot remain at 5 Hz. Assume, for example, that the speed decreases to 4 Hz. In this case the power generated would be P=2(3×3.18)4=240 Watts. More power is being generated and the system has slowed down. Thus, the chance of over stroking or over speeding has been reduced.

Now assume that the power electronics begins to draw 4 amps from the generator, and that this is at the limits of torque or force that the natural energy converter can extract from the environment. In this case, the speed will decrease significantly, for example to 1 Hz. The power generated would be P=2(4×3.18)1=80 Watts. The actual power delivered may be even lower due to increased heating losses in the generator windings caused by the increased current flow. However, power is still being generated as the system motion is greatly retarded. Further increases in the current drawn from the generator would increase the systems impedance mismatch with the energy environment to the point that the drive stops moving and energy can no longer be converted. When it is safe to allow the system to move again, for instance when a wave is at a peak or trough and no vertically moving energy is available, the impedance can be decreased to provide power generation during the ensuing up or down wave motion. The electrical load impedance can be changed very rapidly as compared to the speed of the mechanical parts of the system.

The power generating or absorbing capacity of the generator and electronic circuits does not need to equal the power available to the natural energy converter during a storm. This would not be economical since the full power capacity would be used only rarely. The power capacity needs only to be sufficient to allow higher than optimum electric current to be drawn which increases the system impedance and hinders or essentially stops the energy converter from collecting natural power.

To provide intelligent control of the over-stroke protection technology, a sensor (e.g., shown as 80 in the drawing) is needed to detect the position of the stroking section of the energy converter. In the case of a rotary driven device such as a turbine, a sensor that measures speed is needed; for a linearly driven device, e.g., an hydraulic cylinder, a cylinder piston position sensor is needed. Such sensors would normally be present in known power generating systems to provide operational information and, for use with the present invention, the outputs from such sensors are also communicated to the over-stroke controller. In a simple control strategy, an over-stroke control computer 22 constantly monitors the stroke position or system rotary speed and does not take action unless the measured values exceed a pre-selected value. When the stroke position or rotary speed exceeds the pre-selected value, the over-stroke controller significantly increases the system impedance. If the next sensor readings are still too high, the impedance is again increased. This procedure is repeated until the sensor readings are within the acceptable range. If the rotary speed or position does not increase, the over-stroke control returns to the monitoring mode and the regular (known) power conversion circuit continues to operate the system.

A somewhat more sophisticated strategy for linear motion over-stroke or over-speed control requires calculating the rate of increase of stroke speed or rotary speed. This does not require a sensor in addition to the aforementioned sensors because the difference between sequential readings taken in fixed time steps indicates whether the system is speeding up or not. This speed calculation combined with the absolute position or speed allows the over-stroke control to chose larger or smaller increments of impedance increase to effect a smoother and more efficient control strategy. For example, if the stroke is approaching the allowable stroke limit but is not moving too fast, and is slowing down, a small amount of impedance increase is applied. This keeps the generator operating in an efficient range, and brings the system to a smooth stop. However, in an extreme condition, when the stroke is approaching the allowable stroke limit at a high rate of speed, and the speed is increasing, a large amount of impedance increase is applied. Also, the speed sensor is quickly checked again and the impedance increased again if necessary. This situation will produce inefficient power generation for a short period, and an abrupt braking of the stroke motion. However, power is still generated and the stroke is prevented from mechanically hitting its end-stop and damaging the system.

In the case of rotary motion and the use of the foregoing described more sophisticated control strategy, a larger impedance increase is added to the system if the speed is increasing rapidly as it approaches the speed limit than is added if the speed is slowly increasing as it approached the speed limit.

The described over-stroke/over-speed control approach does not cause undue wear on the system since excess energy is absorbed electrically and not mechanically. Also, it does not absorb all of the excess natural energy but rather causes the natural energy converter to become inefficient and to transfer only a small portion of the excess energy to the drive system.

What is claimed is:

1. A method of operating a system for generating electrical power from a source of variable input energy comprising the steps of:

a. collecting said input energy for causing movements of an energy transferring link for driving an electrical generator for generating and transferring electrical energy to an electrical load;

b. measuring the amount of movement of said link and, when said measured amount of movement exceeds a predetermined amount of movement of said link above which damage to the system is likely to occur, decreasing the electrical impedance of said load by a variable amount dependent upon said measured amount of movement for decreasing said movement to less than said predetermined value for protecting the system against damage while continuing to generate electrical power; wherein:

said source of mechanical energy is surface waves occurring at a first frequency on a body of water;

the method further comprising monitoring the amount of movement of said drive link at a sampling rate in excess of said first frequency, and varying the input impedance of said electrical load at a rate up to said sampling rate in response to varying amplitudes of individual surface waves.

\* \* \* \* \*